United States Patent [19]
O'Reilly et al.

[11] Patent Number: 5,934,320
[45] Date of Patent: Aug. 10, 1999

[54] ROTARY FLUID VALVE SYSTEMS

[75] Inventors: Paul Bernard O'Reilly, Cerritos; James Whittier Daum; Tariq Latif, both of Downey; Richard William Mowery, Long Beach, all of Calif.

[73] Assignee: Barksdale, Inc., Los Angeles, Calif.

[21] Appl. No.: 08/546,381

[22] Filed: Oct. 20, 1995

Related U.S. Application Data

[63] Continuation-in-part of application No. 08/156,469, Nov. 23, 1993, abandoned.

[51] Int. Cl.⁶ .................................................. F16K 11/074
[52] U.S. Cl. ...................... 137/625.21; 137/270; 251/208
[58] Field of Search ........................ 137/625.46, 625.21, 137/270; 251/208

[56] References Cited

U.S. PATENT DOCUMENTS

| | | | |
|---|---|---|---|
| 749,990 | 1/1904 | Holinger | 137/625.46 |
| 1,036,558 | 8/1912 | Butz | 137/625.21 X |
| 1,136,589 | 4/1915 | Davis | 137/625.46 |
| 1,519,670 | 12/1924 | Danstrup | 137/625.21 |
| 2,042,186 | 5/1936 | Peterson | 137/625.21 |
| 2,061,716 | 11/1936 | Pratt et al. | 137/625.46 |
| 2,146,983 | 2/1939 | Pick | 137/625.46 |
| 2,189,094 | 2/1940 | Weaver | 277/50 |
| 2,564,444 | 8/1951 | Parsons | 251/87 |
| 2,564,445 | 8/1951 | Parsons | 137/625.46 |
| 2,790,650 | 4/1957 | Boschi | 280/711 |
| 2,843,396 | 7/1958 | Lucien | 280/124 |
| 2,896,965 | 7/1959 | Moustakis | 280/124 |
| 2,905,430 | 9/1959 | Deist | 251/54 |
| 2,910,305 | 10/1959 | Marette et al. | 280/6.1 |
| 2,947,322 | 8/1960 | Christensen | 137/636.1 |
| 2,947,532 | 8/1960 | Christensen | 267/64.16 |
| 2,948,549 | 8/1960 | Schultz | 280/6.1 |
| 2,970,614 | 2/1961 | Christensen | 137/627.5 |
| 2,998,243 | 8/1961 | Schultz | 267/64 |
| 3,006,657 | 10/1961 | Augustin | 280/6.1 |
| 3,014,499 | 12/1961 | Barksdale | 137/625.23 |
| 3,099,461 | 7/1963 | Stelzer | 280/DIG. 1 X |
| 3,104,114 | 9/1963 | Vogel | 280/6.1 |
| 3,214,185 | 10/1965 | Mason et al. | 280/6.1 |
| 3,276,476 | 10/1966 | Jackson | 137/627.5 |
| 3,319,531 | 5/1967 | Sanders | 137/625.46 |
| 3,444,890 | 5/1969 | Ralston | 137/625.46 |
| 3,796,232 | 3/1974 | Dalton | 137/625.21 |
| 3,831,968 | 8/1974 | Shaffer | 280/714 |
| 3,933,368 | 1/1976 | Kellett | 280/714 |
| 4,049,019 | 9/1977 | McClocklin | 137/625.21 |
| 4,065,982 | 1/1978 | Wenger | 137/625.46 |
| 4,076,275 | 2/1978 | Hiruma | 280/707 |
| 4,186,773 | 2/1980 | Flynn | 251/208 |
| 4,377,299 | 3/1983 | Fujii | 280/708 |
| 4,471,805 | 9/1984 | Solie et al. | 137/596.12 |
| 4,488,576 | 12/1984 | Skelly | 137/625.21 |
| 4,641,843 | 2/1987 | Morrisroe, Jr. | 280/840 |
| 4,823,550 | 4/1989 | Decker | 137/625.26 X |
| 4,871,189 | 10/1989 | Van Breemen | 280/711 |
| 4,946,134 | 8/1990 | Orlandi | 251/208 |
| 5,014,748 | 5/1991 | Nogami et al. | 137/625.21 X |
| 5,161,817 | 11/1992 | Daum et al. | 280/714 |

*Primary Examiner*—John Rivell
*Attorney, Agent, or Firm*—Arthur Freilich; Robert Hornbaker; Leon Rosen

[57] ABSTRACT

A rotary fluid valve has a pivotable disk (36) with through slots (38, 39), the disk blocking outer ends of ports (31, 32) in a neutral disk position. When the disk pivots in first or second directions from the neutral position, one of its slots moves into line with one of the ports. This allows pressured air to flow from the now-uncovered port and through the disk slot, and through an upper chamber (46) lying against the upper face of the disk, to allow air to flow between an external fluid coupling (17 or 18) that is coupled to the port, to another external coupling (19, 20) that is coupled to the upper chamber, as to inflate or deflate a vehicle air bag.

2 Claims, 10 Drawing Sheets

ROTARY FLUID VALVE SYSTEMS

CROSS-REFERENCE

This is a continuation-in-part of patent application Ser. No. 08/156,469, filed Nov. 23, 1993, now abandoned, by Richard W. Mowery, James W. Daum, Tariq Latif and Paul B. O'Reilly, for Rotary Fluid Valve Systems, assigned to the common assignee hereof, and herewith incorporated by reference herein.

BACKGROUND AND FIELD OF THE INVENTION

The invention relates to fluid flow control methods and apparatus, such as methods and apparatus for alternatively interconnecting distinct spaced fluid ports, and such as fluid valving and valves, including rotary fluid valves.

SUMMARY OF THE INVENTION

It is an object of the invention to provide improved fluid flow control methods and apparatus.

It is a germane object of the invention to provide improved methods and apparatus for alternatively interconnecting distinct spaced fluid ports in rotary fluid valves.

It is also an object of the invention to provide improved rotary fluid valves.

It is a further object of the invention to provide improved methods and apparatus for alternatively blocking and unblocking a fluid port with a valve rotor or rotary disc.

It is a related object of the invention to provide improved fluid valving methods and apparatus that enable gradual fluid port valving without clogging.

It is an auxiliary object of the invention to facilitate the manufacture of fluid valves, and to reduce manufacturing costs and improve high-volume manufacture.

It is also an object of the invention to provide the valve designer with rheology programming and metering capability in fluid valves.

Other objects will become apparent in the further course of this disclosure.

The invention resides in a method of alternatively interconnecting distinct spaced first, second, and third fluid ports in a rotary fluid valve having a base and a housing, and, more specifically resides in the improvement comprising, in combination, extending such first, second, and third fluid ports to an inside of the base, providing a rotary disc at such first, second and third fluid ports at the inside of the base, providing a pressure-tight chamber on that inside of the base and in the housing in between the rotary disc and an inside of that housing located opposite the base and spaced from the rotary disc, applying pressurized fluid to one of the first, second and third ports and filling the pressure-tight chamber with fluid, moving the rotary disc to and among different angular positions relative to the first, second, and third fluid ports, including blocking that one port in a first angular position of the rotary disc, interconnecting that one port with another of the first second and third ports via the rotary disc in a second annular position of that rotary disc while blocking the remaining one of the first, second and third ports with the rotary disc in that second annular position, and interconnecting the mentioned another port and the remaining port via the rotary disc in a third angular position of that rotary disc while blocking that one port with the rotary disc also in that third angular position.

According to a preferred embodiment of the invention, the housing is provided with an internal shoulder serving as a bearing for the rotary disc, and part of the pressure-tight chamber is encompassed with that internal shoulder.

The invention resides also in a rotary fluid valve, comprising, in combination, a base, first, second, and third fluid ports extending to an inside of such base, a housing on that base, a pressure-tight chamber on that inside of the base in the housing, and a rotary disc at the first, second, and third fluid ports in the pressure-tight chamber, such pressure-tight chamber extending in the housing in between the rotary disc and an inside of that housing located opposite the base and spaced from the rotary disc, such rotary disc including a surface covering at least one of the fluid ports in at least a first angular position of the rotary disc, a first fluid path interconnecting two of the fluid ports in a second angular position of the rotary disk, and a second fluid path interconnecting another two of the fluid ports in a third angular position of the rotary disc, each of these first and second fluid paths extending via the rotary disc through the pressure-tight chamber.

From a related aspect thereof, the invention resides in a rotary fluid valve, comprising, in combination, a base, first, second, and third fluid ports extending to an inside of that base, a housing on that base, a pressure-tight chamber on that inside of the base and in that housing, and a rotary disc at the first, second, and third fluid ports in such pressure-tight chamber; such pressure-tight chamber extending in the housing in between the rotary disc and an inside of that housing located opposite the base and spaced from the rotary disc, such rotary disc including:

a surface covering at least one of the fluid ports in a first angular position of the rotary disc, a first aperture extending from a side of such disc facing the base to a side of that disc facing the housing and interconnecting two of the fluid ports in a second angular position of that rotary disc, and a second aperture extending from the side of the disc facing the base to the side of the disc facing the housing and interconnecting another two of the fluid ports in a third angular position of the rotary disc, with at least one of the fluid ports at one of the first and second apertures being larger than that one aperture.

From another aspect thereof, the invention resides in apparatus for alternatively blocking and unblocking a fluid port with a rotary disc having a slot for fluid flow relative to that fluid port. The invention according to this aspect resides, more specifically, in the improvement enabling gradual fluid port valving and flow metering capability without clogging, comprising, in combination, an asymmetrical edge portion of the disc at a correspondingly asymmetrical configuration of an end portion of the slot relative to a median along that slot, such asymmetrical configuration including a convex lateral projection into the slot, the fluid port having a smaller cross-section than that slot, and a rotary drive for the rotary disc whereby to block the fluid port with that disc and alternatively to wipe the asymmetrical edge portion of the disc across at least part of that fluid port. The slot and the fluid port preferably have different configurations.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which:

FIG. 4A is a detail view similar to FIG. 4 but rotated 90 degrees about the axis 15 to show certain fluid ports recessed from the valve rotor;

DESCRIPTION OF PREFERRED EMBODIMENTS

This is a written description of the invention in terms of embodiments thereof, not only of apparatus, but also of methods as more fully disclosed below.

Figure 1:
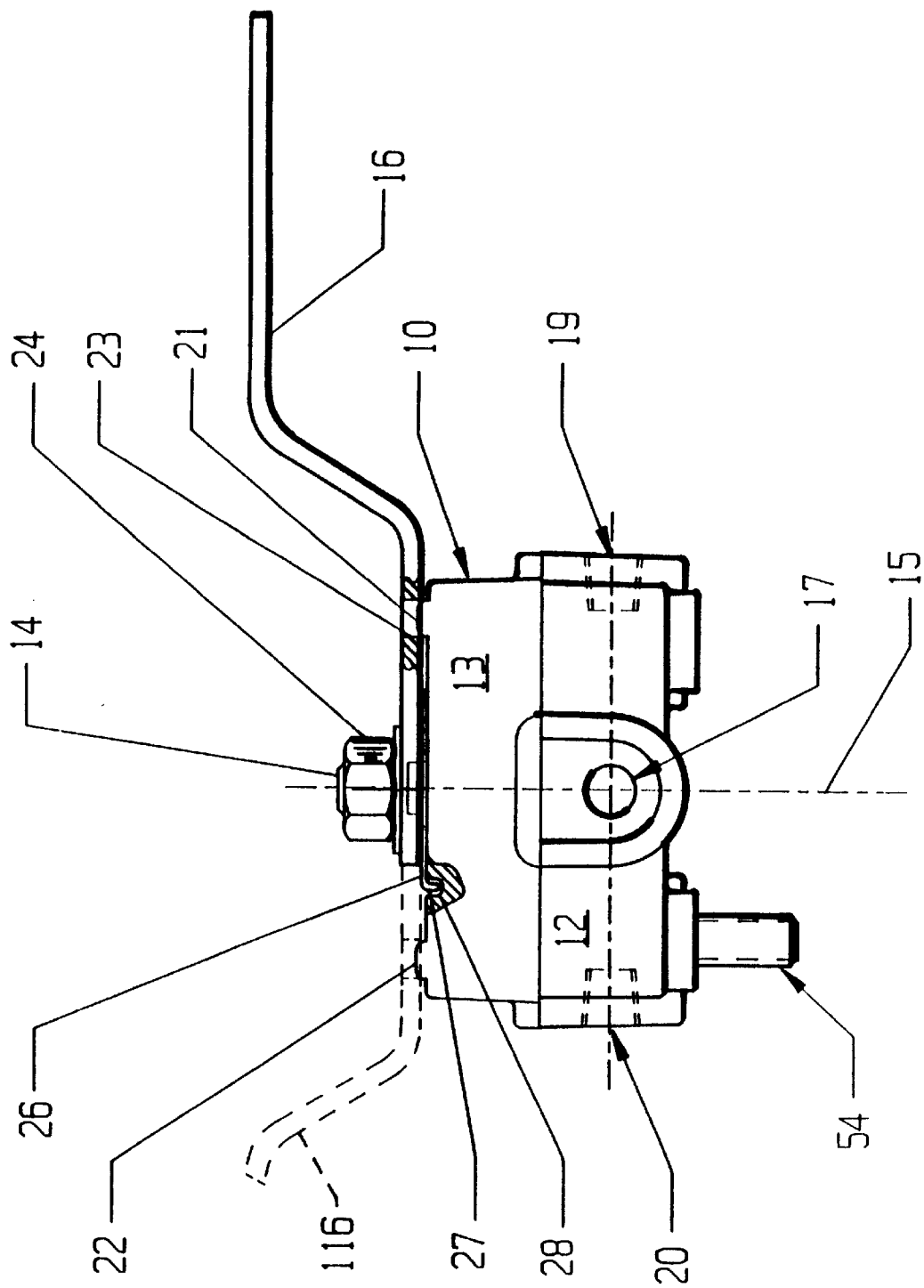
FIG. 1 is a side view of a fluid valve according to a preferred embodiment of the invention.

In terms of apparatus, FIG. 1 is a side view of miniature rotary valve 10 that includes a frame 11 and having a base 12 a base cover or housing 13. The valve also includes a rotary shaft or rotor shaft 14 angularly moveable about an axis 15, an actuating handle or lever 16, and fluid inlets and outlets, or external couplings 17, 18, 19, and 20.

The housing 13 may have detents for temporarily retaining the fluid valve in any one of two or more active or inactive rotary positions, including, for instance, a rest position. By way of example, the housing 13 is shown with two diametrically opposed protrusions or dimples 21 and 22, each acting as a detent or catch for the actuating lever 16. That lever may have an aperture 23 for accommodating either catch at 21 or 22.

The detents 21 to 23 may, however, be omitted, if detentless operation of the fluid valve is desired within the scope of the invention.

The actuating lever 16 may be attached to the rotor shaft 14, such as with the aid of a nut 24 threaded thereon. Such attachment may include a washer 26 having a detent 27 projecting downwardly into an arcuate groove 28 in the housing 13 for limiting rotor travel. In practice, that detent may be in lieu of the detents 21 to 23, or may also be omitted, if detentless operation of the fluid value is desired.

The invention as illustrated alternatively interconnects distinct spaced first, second and third fluid ports in the rotary fluid valve 10 having the base 12. In this respect, the fluid inlets and outlets 17, 18, and 19 are extended as first, second, and third fluid ports 31, 32, and 33 to an inside of the base 12, and a pressure-tight chamber 34 is provided on that inside of the base.

Figure 2:
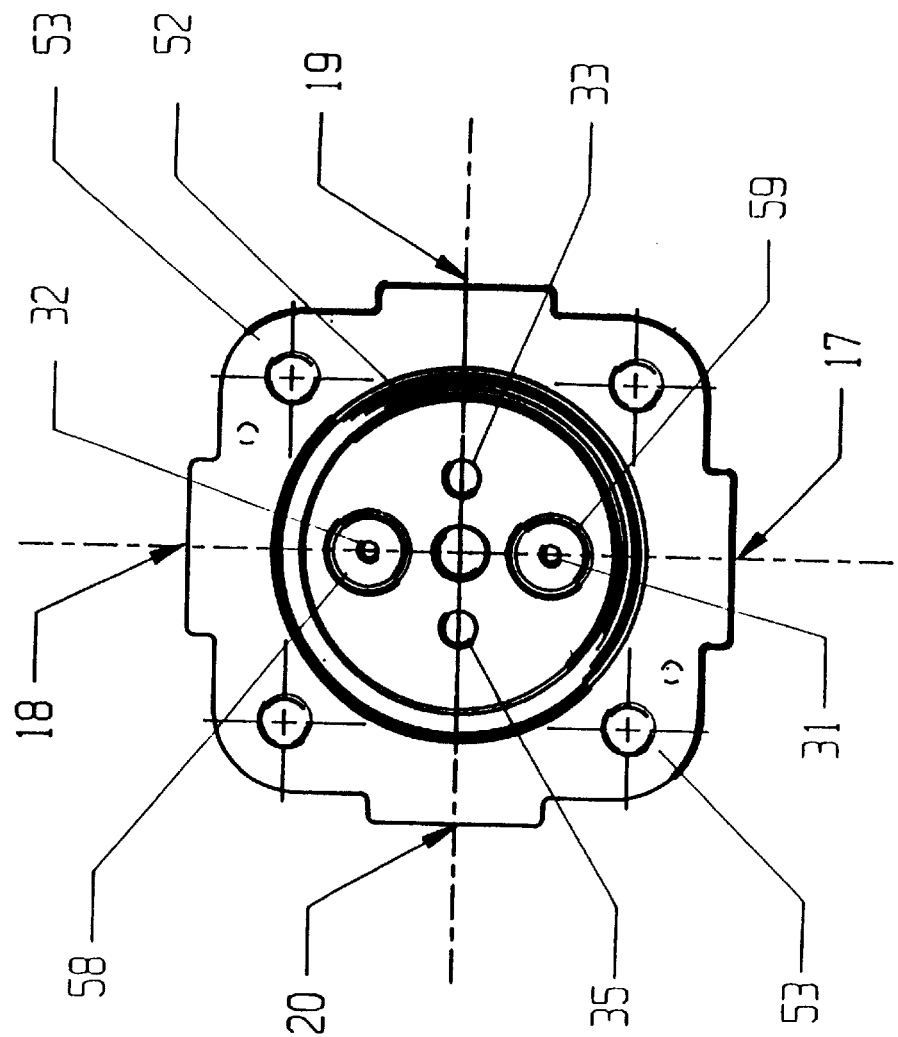
FIG. 2 is a top view of the lower base of the valve of FIG. 1.

In practice, the fluid inlet or outlet 20 may also be extended to the base inside, such as shown at 35 in FIG. 2; but the invention is currently described with only three fluid ports 31, 32 and 33, but additional ports may be provided.

Figure 3:
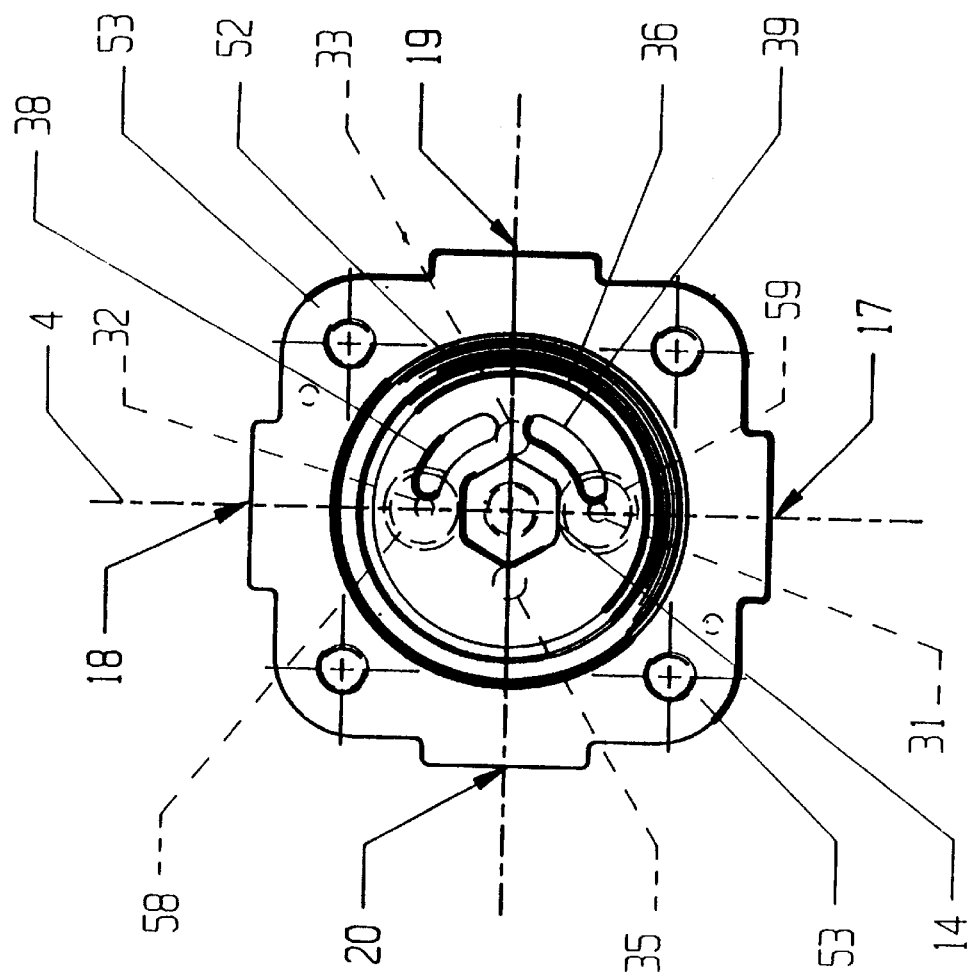
FIG. 3 is a view similar to FIG. 2 showing a valve rotor or rotary disc according to an embodiment of the invention in place.

A rotary disc 36 is provided at the first, second, and third fluid ports 31, 32 and 33, in the pressure-tight chamber 34. That rotary disc is shown in FIG. 3, but has been omitted from FIG. 2 to reveal the fluid ports 31 to 35. The disk 36 has an inner face that lies facewise against the outer ends of the port walls, and the disk has an opposite outer face that faces an outer or upper chamber 46 in the frame.

The pressure-tight chamber 34 is filled with fluid, such as through one of the inlets 17 to 20 and through one of the ports 31, 32, 33 or 35.

The operation of the fluid valve 10 includes moving the rotary disc 36 to and among different angular positions relative to the first, second, and third fluid ports 31, 32 and 33, and alternatively interconnecting such first, second and third fluid ports via that slotted disc differently in said different angular positions.

For example, one of the fluid ports 31 or 32 is blocked with the disc 36 in one of its angular positions. As seen in FIG. 3, two of the fluid ports 31 and 32 are blocked with the disc 36 in one of the angular positions, which may be a rest position.

Figure 4:
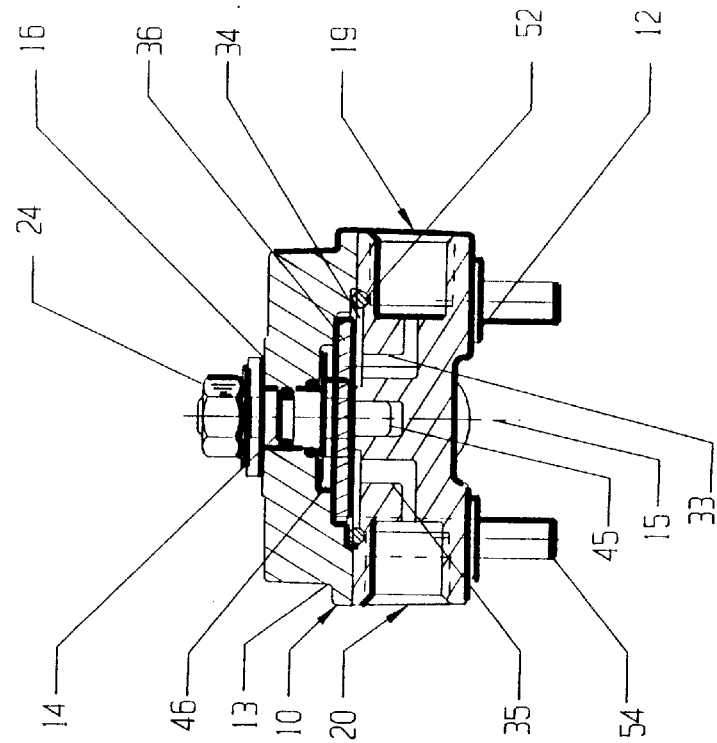
FIG. 4 is a section taken on the axis 15 in FIG. 1.
Figure 4:
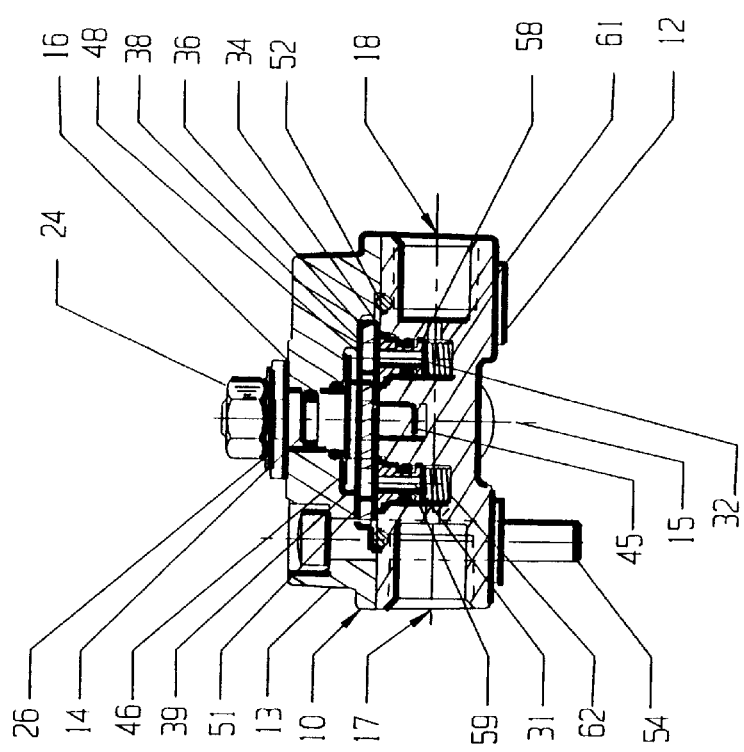

As may further be seen from FIG. 3, all three fluid ports 31, 32 and 33 may be blocked by the disc 36 in a rest position, if all three of such ports extend into fluid-tight sealing contact with that disc, such as in the manner shown for ports 31 and 32 in FIG. 4. Similarly, all four fluid ports 31, 32, 33 and 35 may thus be blocked by the rotary disc 36 in its rest position shown in FIG. 3.

Figure 5:
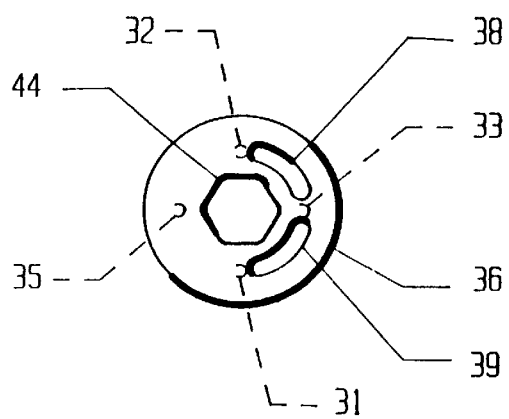
FIGS. 5, 6 and 7 are schematic showings of different positions of the valve rotor or rotary disc of the valve shown in FIGS. 1 to 4.
Figure 6:
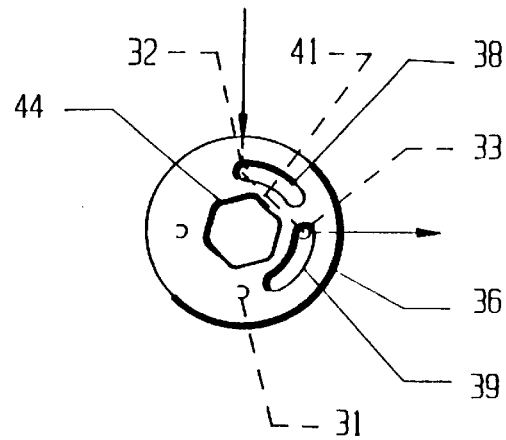
Figure 7:
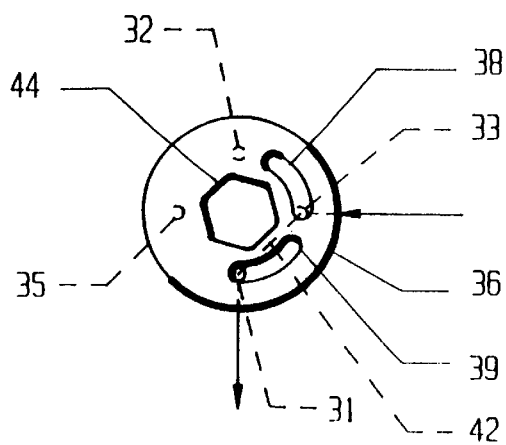

FIGS. 5 to 7 show the rotary disc 36 in various angular positions in the context of the fluid ports 31, 32 and 33, as such disc may appear in the embodiment shown in FIGS. 1 to 4, for instance.

In particular, FIG. 5 shows the rotary disc 36 in its rest position also shown in FIG. 3, wherein at least two of the fluid ports 31 and 32 are blocked by the disc.

FIGS. 6 and 7, on the other hand show positions of the rotary disc 36 in which one of the fluid ports 32 or 31 is blocked with that disc in one of the angular positions shown in FIG. 6 or 7, and in which another of the fluid ports 31 or 32 is blocked with that disc in another of the angular position shown in FIG. 7 or 6.

FIGS. 6 and 7 also show disc positions in which one of the fluid ports 31 or 32 is blocked with the disc 36 in one of its angular positions, while the other fluid ports 32 and 33, or 31 and 33, respectively, are interconnected via that slotted disc in that one angular position as shown in FIG. 7 or in FIG. 6, respectively.

Within the scope of the invention, the rotary disc 36 could be slotted, such as in the sense of having grooves in the side of the disc facing the fluid ports 31 to 33. These grooves could be arcuate, as the grooves 38 and 39 shown in FIGS. 3 and 5 to 7.

To keep the slots 38 and 39 as short as shown in FIGS. 3 and 5 to 7, only the ports 31 and 32 are brought into contact with the disc 32, such as shown in FIG. 4. In such case, the third port 33 is recessed inwardly from the disc 36, such as seen in FIG. 4A, so that such third port 33 is never blocked by the disc, but is in constant communication with the fluid chamber 34 at least below that disc 36 between that disc and the fluid valve base 12.

Accordingly, fluid can flow alternatively along the rotary disc 36 essentially along the dotted lines 41 and 42 shown in FIGS. 6 and 7; such flow typically taking place only in and along the fluid chamber 34 between the disc 36 and the inside of the base 12.

Pursuant to a preferred embodiment of the invention, the rotary disc 36 is slotted by providing the slots as slot-like apertures 38 and 39 through that disc. If the disc 36 is of aluminum or of another metal, such slots 38 and 39 may be formed by stamping. There are, however, many ways, including machining, electroerosion, molding, etc., in which these slots and a central slot or non-circular aperture 44 can be formed.

The non-circular aperture 44 may be provided for engagement by a complementary non-circular end 45 of the rotor shaft 14, whereby the rotary disc 36 is angularly moveable about the axis 15 shown in FIGS. 1 and 4.

If the slots 38 and 39 are slot-like apertures, the first, second, and third fluid ports 31, 32 and 33, extended to an inside of the base 12, are alternatively interconnected through these slot-like apertures. Fluid flows indicated by dotted lines 41 and 42 in FIGS. 6 and 7 then extend through such slots 38 and 39 and may extend into or through an upper chamber 46 forming part of the pressurized chamber 34.

Figure 15:
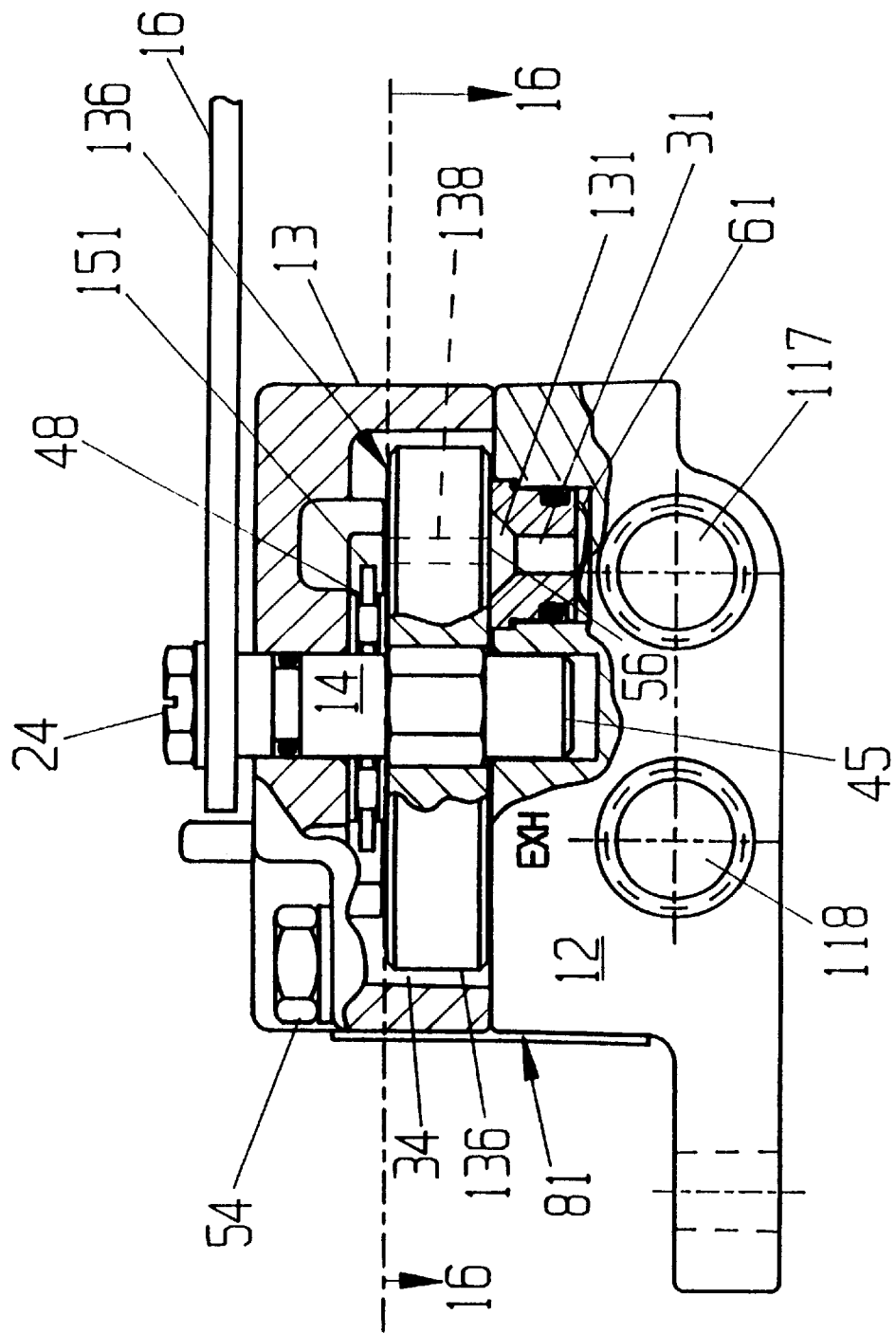
FIG. 15 is a side view, partially in section, of a fluid valve according to a further embodiment of the invention.

The pressure-tight chamber 38 thus is provided on the inside of the base 12 and extends in the housing 13 in between the rotary disc 36 and an inside of that housing located opposite the base 12 and spaced from the rotary disc, such as shown at 46 in FIG. 4 and in the corresponding region of FIG. 15.

Pressurized fluid is applied to one of the first, second and third ports 31–33 and the pressure-tight chamber 34–46 is filled with fluid, such as in the manner mentioned above or hereinafter.

Movement of the rotary disc 36 to and among different angular positions relative to the first, second, and third fluid ports, includes blocking at least one port, such as the port 31 and/or 32, in a first angular position of that rotary disc.

Such one port is interconnected with an other one of the first, second and third ports via the rotary disc in a second annular position of the rotary disc while the remaining one of such first, second and third ports is blocked with that rotary disc 36 in such second annular position. The mentioned other port and the remaining port are interconnected via the rotary disc in a third angular position of that rotary disc 36 while blocking the one port with that rotary disc also in such third angular position.

All this makes for a large versatility of the fluid valve. For instance, as shown in FIG. 6, the first fluid port 31 is blocked with the rotary disc 36 in one of the angular positions of the rotary disc, while the second and third fluid ports 32 and 33 are interconnected via that slotted disc 36 in that one angular position.

Alternatively, the second fluid port 32 is blocked with the disc 36 in another of its angular positions shown in FIG. 7, while the first and third fluid ports 31 and 33 are interconnected via that slotted disc in that other of its angular positions.

As shown in FIGS. 5 to 7, two of the fluid ports 31 and 32 are blocked with the disc 36 in one of these angular positions shown in FIG. 5, one of these two fluid ports 31 and another of the fluid ports 33 are interconnected via that slotted disc in another angular position of that slotted disc shown in FIG. 6 and the other of the two fluid ports 32 and the other of the fluid ports 33 are interconnected via the slotted disc 36 in yet another angular position of that slotted disc down in FIG. 7.

As already indicated above, if the third fluid port 33 is raised into contact with the rotary disc, such as in the manner shown in FIG. 4 for the ports 31 and 32, then the first, second, and third fluid ports 31, 32 and 33 may be blocked with that disc 36 in one of its angular positions shown in FIG. 3.

The first fluid port 31 and the third fluid port 33 are then interconnected via that slotted disc 36 in another of its angular positions shown in FIG. 7. The second fluid port 32 and the third fluid port 33 are thereupon interconnected via that slotted disc 36 in yet another of the angular positions shown in FIG. 6.

According to an embodiment of the invention, the pressure-tight chamber inside the fluid valve is filled with fluid from one of said fluid ports on a side 48 of that disc 36 opposite the base 12 of the fluid valve. In this respect, the disc 36 may be provided with at least one aperture extending from a side 56 of the disc facing the base 12 to the opposite side 48 of that disc. As seen in FIGS. 6 and 7, the aperture in question may, for instance, be the slot 38 or 39, or the slots 38 and 39 through which the upper part 46 of the fluid-tight chamber 36 is charged with pressurized fluid through fluid ports 31, for example.

FIGS. 5 to 7 may be seen as a first range of angular positions of the rotary disc 36 in which such different angular positions are located.

According to another embodiment of the invention, the actuating handle or lever 16 and thereby the rotary disc 36 is swung through a semicircle to an alternate position indicated by a dotted lever outline 116 in FIG. 1 and thus to a second range of angular positions of that rotary disc, and the first, second, and third fluid ports 31, 32 and 33 are alternatively interconnected by angular movement of that swung rotary disc within the second range of angular positions of that swung rotary disc 36.

As long as the third fluid port 33 is offset downwardly from the disc 36 in the fluid chamber 34, the fluid valve operates substantially equally in the first range of angular movement shown in FIGS. 5 to 7, and in the obverse, semicircularly shifted second range of angular movement just described herein.

In this respect, FIG. 1 shows two detents 21 and 22 for accommodating the fluid valve operation in either range, if a stop of the handle or actuating lever 16 is desired in each of the disclosed first and second ranges. Of course, the third detent 27 would then be omitted or relocated. All detents may, in fact, be omitted, if no stop of the handle 16 or rotor 36 is desired in the operation of the fluid valve, depending on its application and utility.

The disclosed provision of alternate ranges of operation of the fluid valve 10 is of real utility in various applications. For instance, when mounting fluid valves of the type herein disclosed in different locations, it is often more convenient or operationally more effective to have the handle or operating lever 16 arranged as shown in FIG. 1 in solid outline in some instances, or to have such lever 16 pointing in the opposite direction as shown by the dotted outline 116 in other instances.

As already indicated above, the fluid ports 31, 32, and 33 may be the same for both ranges of operation. However, as indicated in FIG. 5, a fourth fluid port 35 may be provided preferably opposite the third fluid port 33.

In practice, such third and fourth fluid ports 33 and 35 may, for instance, be alternatives, with whatever is connected to the third fluid port 33 for a first range of operation being alternatively connected to the duplicate third or fourth fluid port 35 in the second range of operation of the fluid valve 10.

Within the scope of the invention, either or both of such fluid ports 33 and 35 could be recessed inwardly from the rotary disc 36 in the fluid chamber 34, or either or both of such fluid ports 33 and 35 could be extended into contact with the rotary disc 36, such as shown for the first and second fluid ports 31 and 32 in FIG. 4.

According to the preferred embodiment of the invention shown in FIGS. 1 to 4, the housing 13 is provided with an internal shoulder 51 adapted to serve as a bearing for the rotary disc 36. Part of the pressure-tight chamber 34, such as its upper part 46, is encompassed with such internal shoulder 51, such as seen in FIG. 4.

A pressure-tight chamber 34 is provided on the inside of the base 12 by sealing the housing 13 to that base, such as by means of an O-ring 52 and by means of bolts 53 tightening the housing 13 to its base 12. Further bolts, one of which is shown at 54 in FIG. 4, may be provided to attach the fluid valve 10 to a structure or support.

The rotary disc may be provided as a slotted rotary disc 36 between the internal shoulder 51 of the housing 13 and the first, second, and third fluid ports 31, 32 and 33 in the pressure-tight chamber 34. The pressure-tight chamber is filled with fluid and the slotted disc 36 is moved relative to the internal shoulder 51 as its bearing to and among different angular positions relative to such first, second, and third fluid ports. Such first, second, and third fluid ports 31, 32 and 33 are thus alternatively interconnected via slotted disc differently in the different angular positions, such as in the manner disclosed above with reference to FIGS. 5 to 7.

In apparatus terms, the rotary fluid valve 10 comprises, in combination, a base 12, first, second, and third fluid ports 31, 32 and 33 extending to an inside of that base, a housing 13 on that base, a pressure-tight chamber 34 on the inside of that base in the housing 13, and a rotary disc at the first, second, and third fluid ports in that pressure-tight chamber.

The pressure-tight chamber 38 extends in the housing 13 in between the rotary disc 36 and an inside of that housing. That inside is located opposite the base 12 and spaced from the rotary disc, such as shown at 46 in FIG. 4 and in the corresponding region of FIG. 15.

The rotary disc 36 includes a surface 56 covering at least one of the fluid ports 31 to 33 in at least a first angular position of that rotary disc, such as shown in FIG. 5, for instance, a first fluid path, such as shown at 41 in FIG. 6, interconnecting two of the fluid ports, such as 32 and 33, in a second angular position of the rotary disc, and a second fluid path, such as shown at 42 in FIG. 7, interconnecting another two of the fluid ports, such as the ports 31 and 33, in a third angular position of the rotary dics. Each of the first and second fluid paths extends via rotary disc 36 through the pressure-tight chamber 38–46.

A fluid port, such as the port 33 common to the mentioned two of fluid ports, such as the ports 32 and 33, and to the mentioned other two of the fluid ports, such as the ports 31 and 33, is recessed inwardly from the rotary disc 36, such as shown in FIG. 4A, so that such common fluid port is in constant communication with the pressure-tight chamber 38–46.

By way of example, a first slot 38 interconnects two of the fluid ports such as 32 and 33 in a second angular position of the rotary disc, such as shown in FIG. 6, and a second slot 39 interconnects another two of the fluid ports, such as 31 and 33, in a third angular position of that rotary disc 36, such as shown in FIG. 7 and described above.

As also described above, the housing 13 preferably has an internal shoulder 51 abutting the rotary disc as a bearing for that rotary disc 36. Providing an internal shoulder of the rotor as a bearing for the rotor or rotary disc has significant advantages, including a dispensation with the familiar kinds of thrust bearings typical of fluid valves.

The housing 13 may be of a material suitable as a bearing material, at least a the shoulder 51.

Oil and temperature resistant plastic materials with self-lubricating properties are particularly suitable. These include acetal homopolymers, such as those sold under the tradename DELRIN, acetal copolymers, such as those sold under the tradename CELCON, nylon, such as nylon products sold under the tradename ZYTEL, polypropylene, such as sold under the tradename PROFAX-7523, or THERMO-FIL with a 10% glass fill, thermoplastic polyester, such as sold under the tradename VALOX, polyphenylene oxide, such as sold under the tradename NORYL, and polycarbonate, such as sold under the tradename LEXAN-500, with a 10% glass fill.

As seen in FIG. 4, at least the first and second fluid ports 31 and 32 are provided by or include fluid port inserts 58 and 59 which are biased by springs 61 and 62 against the rotary disc 36 which, in turn, is thereby biased against its bearing shoulder 51.

Reference may also be had to U.S. Pat. No. 5,161,817, by James W. Daum, Tariq Latif and Paul B. O'Reilly, issued Nov. 10, 1992 to IMO Industries Inc., for Fluid-Operated Leveling Valve Systems, and herewith incorporated by reference herein. As in that patent, the present fluid ports 31 and 32 or fluid port inserts 58 and 59 may have laterally extended fluid-tight seals around the port holes to reduce undesired response of the fluid valve system to insignificant movements of the rotor disc 36, or to avoid an accidental or undesired escape of fluid from or through either fluid port 31 and 32.

By way of example, the fluid valve 10 may be used in lieu of the fluid valve illustrated in FIGS. 3 to 5 of that Daum et al U.S. Pat. No. 5,161,817 with reference to its FIGS. 1 and 2 thereof.

In that case, the first port 31 of the fluid valve 10 herein disclosed may, for instance, be connected to the fluid supply or main reservoir 64 shown in FIG. 2 of that Daum et al U.S. Pat. No. 5,161,817, while the third fluid port 33 may be connected to the pneumatic fluid spring 21 shown in that patent. The second fluid port 32 may then serve as an exhaust for that fluid spring 21 of the leveling valve system of that patent.

The actuating lever 16 of the fluid valve 10 herein disclosed may be connected to a vehicle axle or supporting structure, such as shown for the lever 80 in that incorporated patent.

In this or any other manner within the scope of the invention, the fluid valve 10 herein disclosed may be used as a leveling valve in a fluid-operated leveling system for or in vehicles. One or more such leveling valves and associated pneumatic fluid springs may be used in each application.

In such cases, fluid valves 10 installed on one side of a vehicle may have their associated fluid spring connected to the third fluid port 33, with the corresponding fourth fluid port 35 shown in FIG. 5 being then plugged up. The actuating lever 16 may then more or less point in the direction shown in solid outline in FIG. 1 for operation of the fluid valve 10 or its rotary disc 36 in the above mentioned first range of operation, illustrated in FIGS. 5 to 7.

Conversely, the actuating lever 16 and thereby the rotary disc 36 may be swung some 180 degrees from the positions shown in FIGS. 1 and 5 for mounting of the fluid valve 10 on the opposite side of the vehicle and for operation of the fluid valve 10 in its above mentioned second range of operation. In that second case, the third fluid port 33 may be plugged up and the pneumatic fluid spring may then be connected to the fourth fluid port 35.

In this case, provision of such fourth fluid port 35 would be largely for convenience and ease of installation, since one and the same third fluid port 33 could be used for serving pneumatic fluid springs on either side of the vehicle and in either range of operation of the fluid valve.

The stops 21, 22 and 27 would, of course, be typically omitted when the fluid valve 10 is used for vehicle or platform leveling purposes, for example.

On the other hand, the fluid valve 10 and similar valves within the scope of the invention can be used in various industrial and other pneumatic, hydraulic, and hydropneumatic applications.

Reference may in this respect be had to U.S. Pat. No. 3,014,499, by Lilburn S. Barksdale, issued Dec. 26, 1961 for Rotary Valve, herewith incorporated by reference herein, and to the numerous similar valves manufactured and sold by Barksdale Controls, in Vernon, Calif., under their "SHEAR-SEAL" trademark.

According to another aspect of the invention, FIGS. 8 to 14 illustrate a method of alternatively blocking and unblocking a fluid port 31 with a rotary disc 36 having a slot 38 for fluid flow relative to that fluid port. This feature may be applied for instance to the valves shown and/or described in or with reference to FIGS. 1 to 4 hereof, such as in lieu of the discs shown in FIGS. 3 to 7, or to the valves shown or disclosed in the above mentioned herein incorporated Daum et al U.S. Pat. No. 5,161,817, such as in lieu of discs shown at 16 in that incorporated patent, or to other fluid valves. Particularly with reference to that incorporated patent, it will be realized that what appears as slots going through the disc 36 in FIGS. 3 to 14 hereof, may in fact be slots opening up to only one side of the disc, such as to the lower side of the disc 16 as seen in FIG. 1 of that incorporated patent.

In either case, the currently disclosed aspect of the invention provides an end portion of the slot 38 with an asymmetrical configuration 71 relative to a median arc m along that slot. Such asymmetrical configuration leaves the disc 36 at that end portion of the slot 38 with a corresponding asymmetrical edge portion 72. As seen in FIGS. 11 to 14, that asymmetrical edge portion 72 is provided with or includes a convex lateral projection into the slot 38, such as shown on the left-hand side of the lead line of the reference numeral 72.

Unlike the design shown in U.S. Pat. No. 4,946,134 by Alessio Orlandi, issued Aug. 7, 1990, the fluid port 32 is provided with a smaller cross-section than the slot 38 and the fluid port 32 and the slot 38 are given different configurations.

Figure 8:
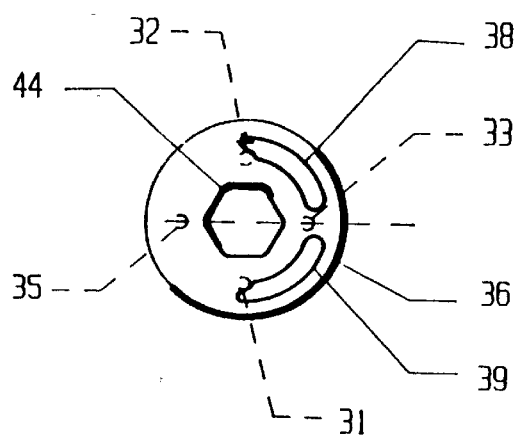
FIGS. 8, 9 and 10 are views similar to FIGS. 5, 6 and 7, showing an embodiment pursuant to another aspect of the invention.
Figure 9:
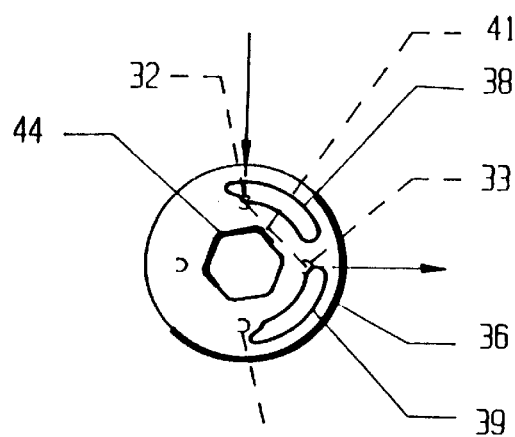
Figure 10:
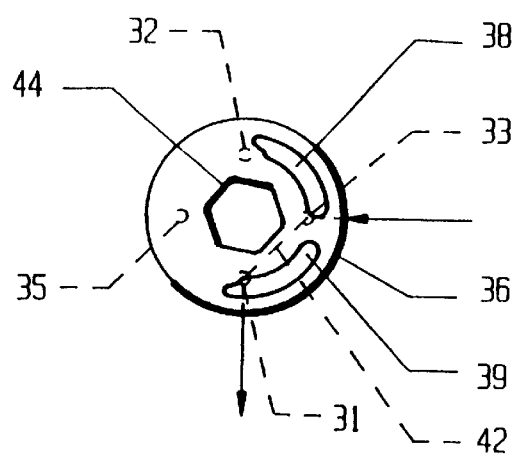
Figure 12:
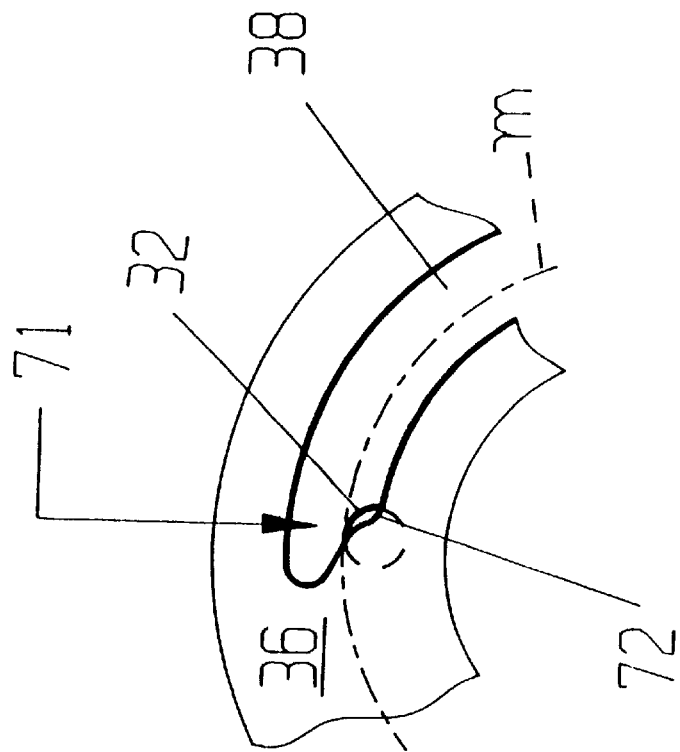
FIGS. 11, 12, 13 and 14 are detail views of an upper part of the valve rotor or disc as seen in FIGS. 8 and 9 in different positions, illustrating that aspect of the invention more fully.

What has been shown as slot 38 in the enlarged partial views of FIGS. 11 to 14 may in fact also be the other slot 39, such as shown in FIGS. 8 to 10 hereof, or either or both of the slots of the disc 16 shown in the incorporated Daum et al patent.

Figure 11:
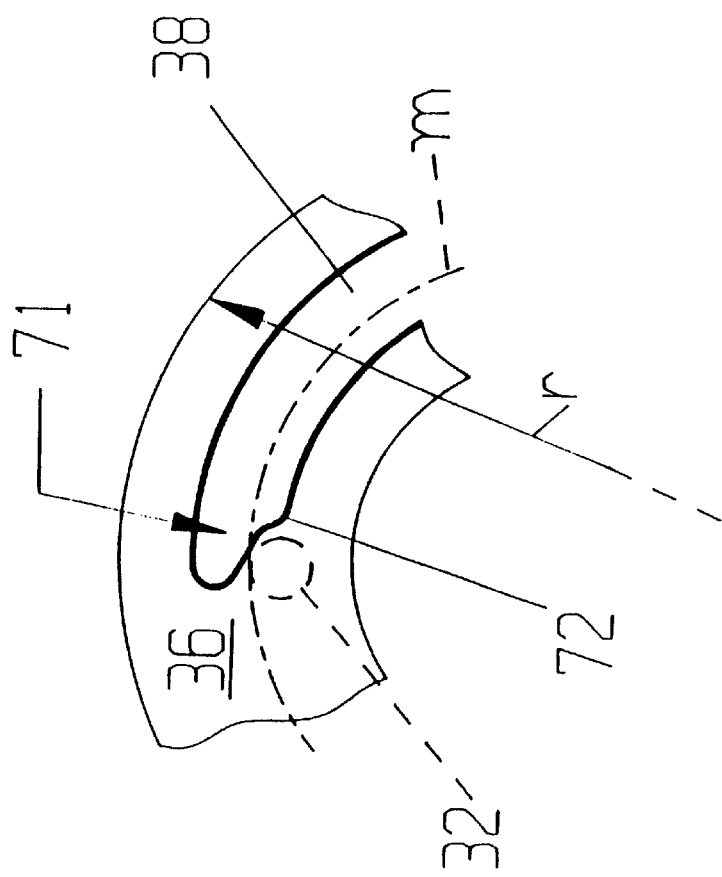

As shown in FIG. 11, the fluid port 32 is blocked with the disc 36 or with any other appropriate disc. The same principle may be applied to the fluid port 31. By way of example, such blocking may take place in a rest position or quiescent state of the valve and/or prior to initiation of a fluid flow through the port 32 in either direction and/or in order to terminate such a fluid flow.

Alternatively, the disc 36 is angularly moved to wipe its asymmetrical edge portion 72 across at least part of the fluid port 32.

According to an embodiment of the invention, the asymmetrical edge portion 72 is slanted or has a slant relative to both a radius r of the disc and the median arc m, such as shown in FIGS. 8 to 14. By way of example, the asymmetrical configuration 71 may have or is given a bullnose shape as also shown in FIGS. 11 to 14. As its name implies, "bullnose" refers to the familiar configuration of the forehead and nose portion of a bull of the bovine family.

From a related aspect thereof, the invention resides in apparatus for alternatively blocking and unblocking a fluid port with a rotary disc 36 having a slot 38 for fluid flow relative to that fluid port, comprising, in combination, an asymmetrical edge portion 72 of that disc at a correspondingly asymmetrical configuration 71 of an end portion of the slot 38 relative to a median arc m along that slot, and a rotary drive for that rotary disc, such as shown in, or mentioned with reference to, FIGS. 1 to 4 hereof, whereby to block a fluid port with the disc 36 and alternatively to wipe the asymmetrical edge portion 72 of the disc across at least part of the fluid port. The above mentioned convex lateral projection at 72 and other features mentioned above may also be part of this aspect of the invention.

Figure 14:
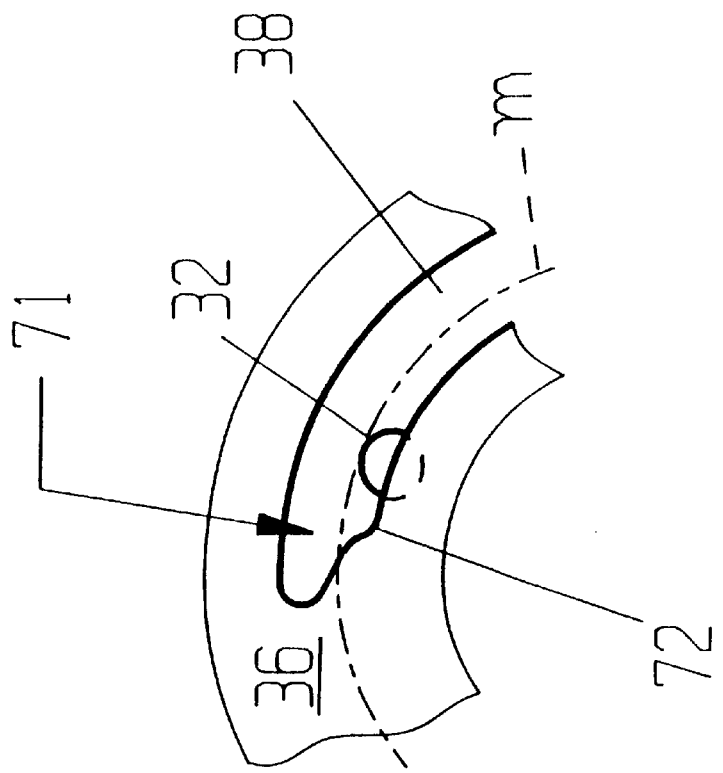
Figure 13:
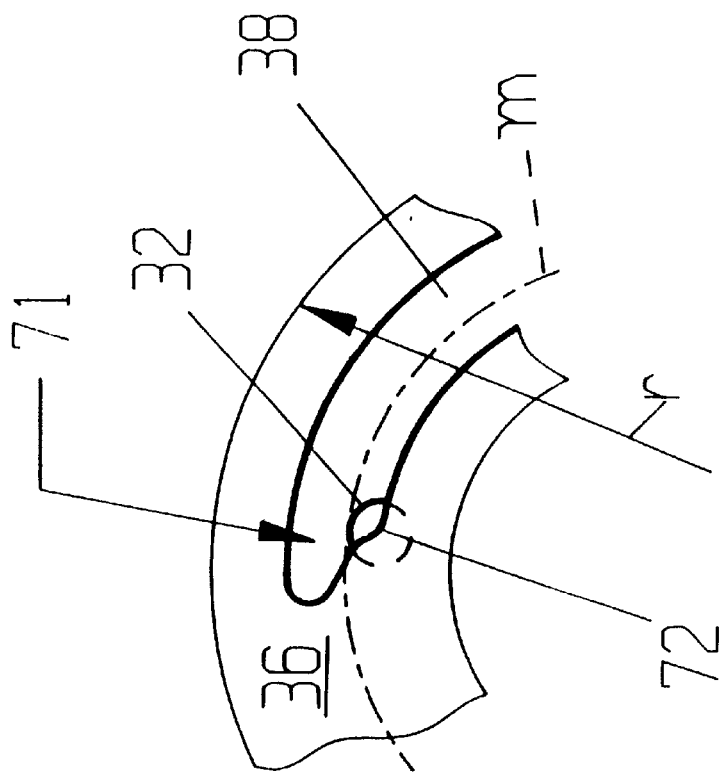

Looking at FIGS. 11 to 14, it may be noted that the orifice of the fluid port 32 looks like the moon rising from behind a rock to a human observer. Indeed, the obstructed fluid port 32 of FIG. 11 may be compared to "new moon" and there may be "moon phases" by analogy, as apparent from FIGS. 12 to 14. Indeed, certain crescent shapes and gibbous configurations may be realized within the scope of the invention, as desired or necessary for various applications or effects. Also, as shown in FIG. 14, there need be no "full moon," if any application requires that only half or less than all of the fluid port orifice 32 be exposed during angular travel of the disc 36. However, a "full moon" or totally unobstructed or open fluid port 32 may be realized within the scope of the invention, such as by widening the slot 38 somewhat toward the center of the disc 36 so that the lower part of the orifice 32 gets exposed as well in the position of the disc 36 shown in FIG. 14.

While a median arc has been shown in FIG. 11, such line m could simply be a median, inasmuch as what is called "rotary disc" includes as equivalent a sliding disc or similar valve member within the scope of the invention.

In practice, the embodiments illustrated by FIGS. 11 to 14 are by far preferable to prior-art versions that extended the fluid-conducting slot in discs or other moveable valve members with a narrower groove for low flow during certain movements of that valve member. In practice, such narrow groove became clogged, which could impair the function of the valve. In contrast to such prior-art drawback, the asymmetrical configuration 71 and equivalents thereof within the scope of the subject invention not only are self-cleaning, but provide the valve designer with a variety of useful options in disc design and valve operation with metering features and rheology programming capability.

Figure 16:
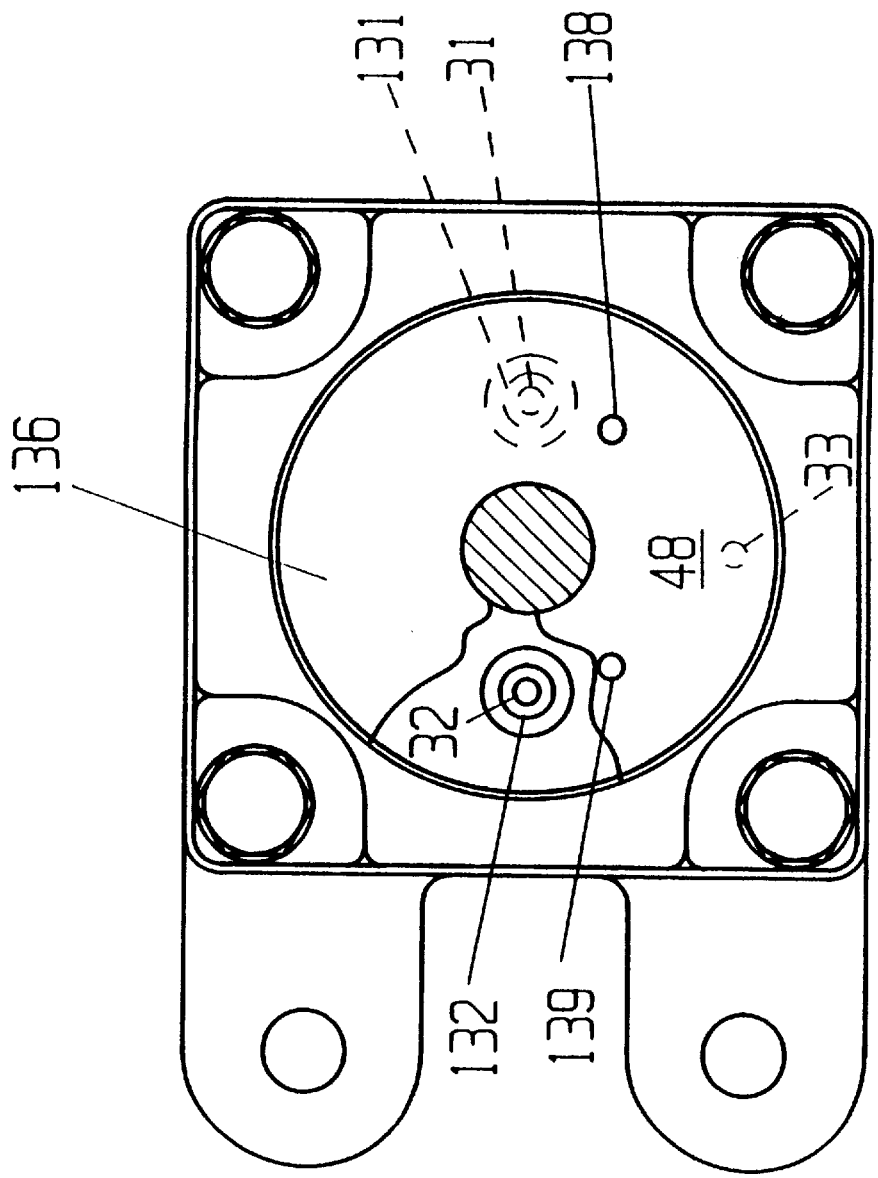
FIG. 16 is a top view of the base and rotor portion of the further fluid valve of FIG. 15, as seen from the plane 16—16 in FIG. 15.

FIGS. 15 and 16 are views similar to FIGS. 3 and 4 but showing a fluid valve 81 in which the fluid parts are extended while the apertures through the rotary disc 36 are holes rather than slots. The embodiment of the invention shown in FIGS. 15 and 16 is related to the preferred embodiment of FIG. 1 et seq., in that the fluid flow extension represented by slots 38 and 39 of the rotary disc 36 of the preferred embodiment of FIG. 1 et seq. is approximated in the currently less preferred embodiment of FIGS. 15 and 16 by fluid port enlargements, such as presently disclosed.

The aspect of the invention illustrated in FIGS. 15 and 16 also resides in a rotary fluid valve; such as a valve 81 having a base 12 first, second, and third fluid ports 31, 32, and 33 extending to an inside of that base, as already disclosed with reference to FIGS. 1 to 12. As indicated in FIG. 15, fluid inlets or outlets 117, 118 may be arranged in pairs. The same principle may be employed in the design of the valve 10 of FIGS. 1 to 4, with the inlets and outlets in each case leading to the fluid ports as desired.

The valve 81 also has a housing 13 on its base 12, and a pressure-tight chamber 34 on the inside of the base in the housing. Such pressure-tight chamber 34 again extends in the housing 13 in between the rotary disc 136 and an inside of that housing located opposite the base 12 and spaced from that rotary disc.

As before, a rotary disc 136 is at the first, second, and third fluid ports 31, 32, 33 in that pressure-tight chamber. If desired a pair of ports may be provided for the third fluid port 33, such as when there are two air springs or other loads to be supplied with fluid through the valve 81. The rotary disc 136 has a surface covering at least one of said fluid ports in a first angular position of that rotary disc. That disc 136 also has a first aperture 138 extending from a side 56 of the disc facing the base 12 to a side 48 of that disc 136 facing the housing 13 and interconnecting two of the fluid ports, such as 31 and 33 in a second angular position of the rotary disc, and has a second aperture 139 extending from the side 56 of the disc facing the base 12 to the side 48 of the disc facing the housing 13 and interconnecting another two of said fluid ports, such as 32 and 33, in a third angular position of the rotary disc.

According to the currently disclosed aspect of the invention, at least one of the fluid ports 31 and 32 at one of the first and second apertures 138 and 139 is larger than that one aperture. For example, the fluid port 31 as shown at 131 is larger than its corresponding aperture 138 in the disc. According to the embodiment shown in FIG. 16, the second fluid port 32 is also larger at 132 than the corresponding aperture 139. There are several ways of implementing this, but FIGS. 15 and 16 show conical bores 131 and 132 for providing such fluid port enlargements.

In functional terms, the currently discussed aspect of the invention resides in a method of alternatively interconnecting distinct spaced first, second, and third fluid ports 31, 32 and 33 in a rotary fluid valve 81 having a base 12. That method again extends such first, second, and third fluid ports to an inside of that base and providing a pressure-tight chamber 34 on that inside of the base. Such method provides a rotary disc 136 at the first, second, and third fluid ports in the pressure-tight chamber, and provides such disc with apertures 138 and 139 extending from a side of the disc facing the base 12 to an opposite side of the disc at two of the fluid ports, such as 31 and 32.

Such method laterally extends at least one of the fluid ports at least in a direction of angular movement of the rotary disc by a distance larger than a diameter of one of said apertures at that one fluid port. This shows that the fluid bore enlargement 131 or 132 need not be conical but, for example, may be in the form of slots, similar to a slot 38 or 39 mentioned above, extending substantially in the direction of angular movement of the rotary disc 136, as do the slots 38 and 39 shown in FIGS. 3 and 5 to 7. In other words, the fluid port enlargements 131 and 132 may be slots in or at the base 12 or in fluid port inserts instead of conical or other bores.

The pressure-tight chamber 34 is filled with fluid, such as through the fluid port 31.

The apertured disc 136 is then moved to and among different angular positions relative to the first, second, and third fluid ports which are alternatively interconnected via the apertures 138 and 139 differently in different angular positions.

In this respect, the angular movements of the rotary disc 136 may be similar to what has been shown in and described above with respect to FIGS. 5 to 6, except that the slots 38 and 39 are now apertures 138 and 139 and the slots 38 and 39 are other enlargements 131 and 132 are now in or at the base 12, such as in fluid port inserts 158 and 159 which may have the enlarged contact portions with the rotary disc already shown in FIG. 2 and extensively disclosed and shown in the incorporated Daum et al U.S. Pat. No. 5,161,817 as extending the fluid port seals for toleration of road vibrations or other vibrational amplitudes.

While FIG. 16 shows the disc 136 with two apertures or bores 138 and 139 and shows both ports 31 and 32 enlarged at 131 and 132, that disc may be slotted by providing one of the apertures 138 or 139 as a slot 38 or 39 through that disc 136. The first, second, and third fluid ports 31, 32 and 33, are alternatively interconnected through the one aperture 138 or 139 and the disc slot 39 or 38, respectively.

FIG. 15 shows a thrust bearing 151 for the disc 136. The same kind of bearing may be used in the embodiment of FIGS. 1 to 4. However use of the housing shoulder 51 as a disc bearing is presently preferred and may be implemented in the embodiment of FIGS. 15 and 16 as well.

In other respects not specifically mentioned by reference to FIGS. 15 and 16, the valve 81 may be the same as the valve 10, and like reference numerals as among FIGS. 1 to 4 and 15 and 16 designate line or functionally equivalent parts.

The subject extensive disclosure will render apparent or suggest to those skilled in the art various modifications and variations within the spirit and scope of the subject invention and equivalents thereof.

We claim:

1. A rotary fluid valve, comprising:
    a frame (11) that includes a base (12) having a plurality of external fluid couplings (17, 18, 19, 20), said base also forming first and second ports (31, 32) having inner port ends respectively connected to first and second of said external couplings, with said ports having outer port ends;
    a disk (36) having inner and outer opposite faces with said inner face lying facewise against said outer port ends to block them, with said disk having at least one through slot (38, 39) therein, and with said disk being pivotable about an axis (15) in opposite directions from a neutral position;
    said frame forming an upper chamber (46) in communication with a third of said external fluid couplings and in communication with said outer face of said disk when said disk pivots in either of said directions from said neutral position;
    said at least one through slot being positioned to unblock only said first port outer end when said disk pivots in a first direction from said neutral position, and to unblock only said second port outer end when said disk pivots in said second direction from said neutral position;
    said at least one through slot lying within a total angle of less than 180°, with a third of said external fluid couplings (19, 33) being coupled to at least one of said through slots to communicate with said upper chamber when said disk pivots in either direction from said neutral position.

2. A rotary fluid valve, comprising:

a frame (11) that includes a base (12) having a plurality of external fluid couplings (17, 18, 19, 20), said base also forming first and second ports (31, 32) having inner port ends respectively connected to first and second of said external couplings, with said ports having outer port ends;

a disk (36) having inner and outer opposite faces with said inner face lying facewise against said outer port ends to block them, with said disk having at least one through slot (38, 39) therein, and with said disk being pivotable about an axis (15) in opposite directions from a neutral position;

said frame forming an upper chamber (46) in communication with a third of said external fluid couplings and in communication with said outer face of said disk when said disk pivots in either of said directions from said neutral position;

said at least one through slot being positioned to unblock only said first port outer end when said disk pivots in a first direction from said neutral position, and to unblock only said second port outer end when said disk pivots in said second direction from said neutral position;

said at last one through slot subtending an angle of less than 180°.

\* \* \* \* \*